United States Patent [19]
Wadell

[11] Patent Number: 5,632,369
[45] Date of Patent: May 27, 1997

[54] APPARATUS FOR DISTRIBUTING PARTICULATE MATERIAL

[75] Inventor: Lars G. A. Wadell, Aengelholm, Sweden

[73] Assignee: Nestec S.A., Vevey, Switzerland

[21] Appl. No.: 30,891

[22] Filed: Mar. 11, 1993

Related U.S. Application Data

[62] Division of Ser. No. 556,651, Jul. 20, 1990, Pat. No. 5,195,454.

[30] Foreign Application Priority Data

Aug. 1, 1989 [EP] European Pat. Off. ............ 89114154

[51] Int. Cl.$^6$ .................................................. B65G 47/04
[52] U.S. Cl. ....................... 198/525; 198/580; 198/533; 118/19
[58] Field of Search ....................... 198/525, 580, 198/533; 118/24, 19, 418; 366/9, 25, 153.3, 186, 233, 533, 580, 525

[56] References Cited

U.S. PATENT DOCUMENTS

| | | |
|---|---|---|
| 1,042,929 | 10/1912 | Lanaux . |
| 2,122,551 | 7/1938 | Allingham . |
| 2,577,433 | 12/1951 | Robb . |
| 2,976,125 | 3/1961 | Buzzan . |
| 2,984,860 | 5/1961 | Thomas . |
| 3,045,640 | 7/1962 | Hill et al. . |
| 3,083,081 | 3/1963 | Sharp et al. . |
| 3,189,326 | 6/1965 | Brown, Jr. et al. . |
| 3,487,911 | 1/1970 | Wirz . |
| 3,515,260 | 6/1970 | Clyne ................................. 198/499 |
| 3,589,531 | 6/1971 | Povias ................................. 198/443 |
| 3,602,271 | 8/1971 | Neal . |
| 4,023,776 | 5/1977 | Greten . |
| 4,248,173 | 2/1981 | Kuhlman . |
| 4,339,203 | 7/1982 | Murray ................................. 366/9 |
| 4,497,244 | 2/1985 | Koppens . |
| 4,762,083 | 8/1988 | Wadell . |
| 4,984,678 | 1/1991 | Fauehard ................................. 198/443 |

*Primary Examiner*—Brenda Adele Lamb
*Attorney, Agent, or Firm*—Vogt & O'Donnell, LLP

[57] ABSTRACT

Particulate material falling from an end of a belt positioned within a rotatable hollowed drum is distributed over an axial width of the interior wall of the drum by a guiding device.

10 Claims, 4 Drawing Sheets

APPARATUS FOR DISTRIBUTING PARTICULATE MATERIAL

CROSS REFERENCE TO RELATED APPLICATION

This application is a divisional application of application Ser. No. 07/556,651, filed Jul. 20, 1990 now U.S. Pat. No. 5,195,454.

BACKGROUND OF THE INVENTION

The present invention relates to an apparatus and method of coating a foodstuff with a particulate material.

Normally, during the coating of foodstuffs with particulate material, large amounts of coating material fall off the foodstuff during the coating process, and it is important that this excess coating material is reused. In conventional equipment used, for example, in coating frozen fish on both sides with bread crumbs, excess coating material is normally transported upwards for reuse by means of elevator screws. However, not only are delicate crumbs damaged by screws, but also large amounts of coating material are always in circulation and exposed to the warm air of the environment which is not desirable since it is important that the coating material should be maintained at as low a temperature as possible. Therefore, in many cases even today, coating of certain products with particulate material is carried out manually. In U.S. Pat. No. 4,762,083, a completely new principle is described for coating a food-stuff with a particulate material using an apparatus which is not only very much simpler but also enables very much smaller amounts of coating material to be in circulation at any period in time when compared with conventional apparatus. This apparatus comprises:

a drum capable of rotating about a substantially horizontal longitudinal axis;

a first horizontal conveyor adapted to travel through the drum;

a second horizontal conveyor below the first conveyor, adapted to travel in a direction opposite the first conveyor, the second conveyor comprising at least first, second and third successive endless belts each having a horizontal upper run and a gap between each successive pair of belts, the second belt having an inclined portion extending to a position below the first belt, the gap between the second and third belts being situated within the drum;

means for feeding particulate material onto the first conveyor; and means for feeding a foodstuff onto the first belt;

such that in operation, particulate material is fed from the first conveyor onto the foodstuff on the first belt for coating the foodstuff on an upper side, the coated foodstuff is transported to the second belt with excess particulate material falling off the first belt onto the inclined portion of the second belt and is conveyed to the horizontal upper run of the second belt for coating the foodstuff on a bottom side, the coated foodstuff is fed to the third belt with further particulate material falling through the gap between the second and third belts onto an inside wall of the drum which rotates for conveying the further material to a position above the first conveyor upon which the further material falls by gravity, and the first conveyor transports the further material back to the second conveyor.

However, although this apparatus enables the foodstuff to be coated on all sides, the coating is not always satisfactorily uniform owing to the fact that an even distribution of particulate material is not always obtained before the particulate material reaches the foodstuff. I have now discovered that one reason for this is that the further particulate material falling through the gap between the second and third belts onto the inside wall of the drum does not form a sufficiently even layer over the whole axial width of the inside wall of the drum so that when this further particulate material has been conveyed by the rotation of the drum to a position above the first conveyor, it does not form an even layer on the first conveyor as it falls onto it. This means that the further particulate material is not transported evenly to the second conveyor on which the foodstuff is lying.

SUMMARY OF THE INVENTION

I have surprisingly found that if a guiding device is provided to distribute the further particulate material falling between the second and third belts substantially evenly over the whole axial width of the inside wall of the drum, a satisfactorily uniform coating is obtained on all sides of the foodstuff.

Accordingly, the present invention provides an apparatus which includes a rotatable drum having an interior circumferential wall which is positioned to have a horizontal axis and which defines a hollowed drum interior, an endless belt which is positioned to extend into and have an end which terminates within the drum interior for conveying particulate material, and a guiding device positioned for guiding and distributing conveyed particulate material which falls from the end of the belt substantially evenly over an axial width of a portion of the interior wall.

DETAILED DESCRIPTION OF THE INVENTION

An apparatus for coating a foodstuff, which includes the guiding device of the present invention, comprises:

a drum capable of rotating about a substantially horizontal longitudinal axis;

a first conveyor adapted to travel through the drum;

a second conveyor below the first conveyor, the second conveyor comprising at least first, second and third successive endless belts each having a substantially horizontal upper run and a gap between each successive pair of belts, the second belt having an inclined portion extending to a position below the first belt, the gap between the second and third belts being situated within the drum;

means for feeding particulate material onto the first conveyor; and means for feeding a foodstuff onto the first belt;

such that in operation, particulate material is fed from the first conveyor onto the foodstuff on the first belt for coating the foodstuff on an upper side, the coated foodstuff is transported to the second belt with excess particulate material falling off the first belt onto the portion of the second belt below the first belt and is conveyed to the substantially horizontal upper run of the second belt to form a layer on which the coated foodstuff lies after being transported from the first belt to the substantially horizontal upper run of the second belt for coating the foodstuff on a bottom side, the coated foodstuff is fed to the third belt with further particulate material falling through the gap between the second and third belts onto an inside wall of the drum which rotates for conveying the further material to a position above the first conveyor upon which the further material falls by gravity, and the first conveyor transports the further material back to the second conveyor characterised in that there is provided a guiding device for distributing the further particulate material falling through the gap between the second and third belts onto the inside wall of the drum so that it forms a substantially even layer over the axial width of the inside wall of the drum.

The guiding device is usually positioned inside the drum below the second conveyor preferably beneath the gap between the second and third belts. In one embodiment of the invention the guiding device may comprise two or more stationary guide plates extending downwards which guide the falling further particulate material and which are adjustable manually to the appropriate angle to obtain an even distribution of the further particulate material over the axial width of the inside wall of the drum. However, the adjustment of the guide plates often has to be carried out during the operation of the apparatus while the drum is rotating and it is both difficult and dangerous to reach the adjusting and locking screws inside the drum.

In a preferred embodiment, the guiding device may comprise one or more plates extending downwards, the upper edges of which lie parallel to, and are of substantially the same width as, the upstream edge of the second belt of the second conveyor. The plates are adapted to oscillate automatically in the axial direction of the drum especially with a swinging or pendulous motion. For instance, the plates may be attached to a pin which is adapted to rock to and fro, for example by means of a pneumatic or hydraulic cylinder.

Other types of guiding devices involve the use of an air current, a fan or a rotating starwheel, but guiding devices involving the use of brushes or adjustable screws are less preferred.

Conveniently, the inside wall of the drum is partitioned by means of plates extending inwardly from the circumference defining peripherally adjacent and inwardly opening pockets. Advantageously, positioned adjacent and spaced from the inside wall of the drum, and separated from the wall of the drum by the inwardly extending plates, is an arcuate stationary baffle plate for retaining the particulate material which has fallen through the gap between the second and third belts onto the inside wall of the rotating drum. The baffle plate extends from the approximate level of the second conveyor within the drum to a position above the first conveyor where the upper part of the baffle plate is profiled to enable the particulate material carried by the rotating drum to be distributed evenly over the width of the first conveyor.

Since it is quite common for particulate material to stick in the pockets of the drum, it is advantageous to have an automatic cleaning device which cleans the inside wall or pockets of the drum during rotation of the drum at a position where the wall is descending after the particulate material has fallen by gravity from the inside wall of the drum onto the first conveyor, but before the position where the excess particulate material falls through the gap between the second and third belts of the second conveyor onto the inside wall of the rotating drum. The cleaning may be carried out by means of compressed air blowing through a pipe positioned adjacent the inward edges of the inwardly extending plates defining the pockets. Alternatively, the cleaning may be carried out by a reciprocating brush or wire which may be fitted to a fixed pneumatic cylinder, positioned adjacent the inward edges of the radial plates defining the pockets. The reciprocating movement is synchronised with the speed of rotation of the drum so that the brush or wire advances to enter a pocket at the leading end where it scrapes the inner wall of the drum as the drum rotates, and retreats from the pocket at the rear end.

The first conveyor is conveniently substantially horizontal and is preferably an endless belt substantially without perforations. The fresh particulate material, together with that which has fallen by gravity from the upper inside surface of the drum is conveniently transported to an extremity of the first conveyor from where it is transported onto the foodstuff travelling on the first belt of the conveyor below. Conveniently, the first conveyor is adapted to vibrate. When the first conveyor is an endless belt, the vibration may conveniently be achieved by means of a triangular roller situated beneath and in contact with the upper run between the two end rollers. This enables a more even distribution of the particulate material. Advantageously, the first conveyor is adapted to travel in a direction opposite to the second conveyor.

Preferably, a vibrator is positioned between the first and second conveyors to receive the particulate material which falls off the extremity of the first conveyor to distribute it onto the foodstuff travelling on the lower conveyor.

For some foodstuffs, it is advantageous if the particulate material meets the foodstuff as it travels on the first belt of the second conveyor with a force greater than gravity so that the coating sticks well to the surface of the foodstuff. This may be achieved by a rotating stardrum or brushdrum positioned within the flow of particulate material above the foodstuff on the first belt of the second conveyor.

The first belt of the second conveyor may be solid so that all excess particulate material falls off the leading edge onto the position of the second belt lying below the first belt. In this case, advantageously there is an additional belt having a horizontal upper run located between the first and second belts above the portion of the second belt lying below the first belt, there being a gap between the additional belt and the first belt and the upper run of the second belt, such that the foodstuff coated on the upper side is transported from the first belt onto the additional belt and then to the second belt with excess particulate material falling through the gap between the first and additional belt onto the portion of the second belt lying below the first belt. Advantageously, a pivotally adjustable plate may be provided beneath the gap between the first and additional belt to adjust the amount of particulate material falling onto the portion of the second belt lying below the first belt.

However, the first belt of the second conveyor is advantageously perforated to enable excess particulate material to fall through the perforations onto the portion of the second belt below the first belt. It is also possible for the first belt of the second conveyor to be perforated together with a solid plate mounted beneath the upper run which may be stationary or adjustable, e.g., pivoted or slidable to control the amount of particulate material falling onto the portion of the second belt below the first belt. Any belt containing gaps or apertures is suitable, but a wire mesh is especially preferred. The perforations may have a pitch up to 2.5 cm or more depending upon the size of the particulate material.

The second and third belts of the lower horizontal conveyor are preferably solid belts substantially without perforations or perforated belts with a solid plate mounted beneath the upper run. If desired, one or more belts may be provided which succeed the third belt to carry the coated food product away.

The foodstuff may be any foodstuff which may be coated with particulate material, for example chocolate, confectionery, ice cream, vegetables, meat or fish. In some cases, before being coated, the foodstuff is conveniently treated to enable the particulate material to adhere to the foodstuff. For example, an adhesive surface may be formed on confectionery articles by heating or the application of a binding agent while fish may be battered. Ice cream may be heated by infrared heating or steam to impart a sticky surface to it.

The particulate material may be any kind of crumb, granular or powdery material such as bread or confectionery, crumbs, nut splinters, flour, starch, raisins, sugar crystals, shredded cheese, or particulate material from dehydrated potato, for example, potato flakes, potato powder or potato granules.

The present invention also provides a method for coating a foodstuff with a particulate material comprising: p1 transporting particulate material on a first substantially horizontal conveyor;

transporting a foodstuff on a second substantially horizontal conveyor positioned below the first conveyor in a direction opposite that of the first conveyor, the second conveyor comprising at least first, second and third successive endless belts each having a substantially horizontal upper run and a gap between each successive pair of belts, the second belt having an inclined portion extending to a position below the first belt;

feeding the particulate material from the first conveyor onto the foodstuff on the first belt for coating the foodstuff on an upper side;

transporting the coated foodstuff to the upper run of the second belt while particulate material falls off the first belt onto the portion of the second belt lying below the first belt for being conveyed from the inclined portion to the horizontal upper run of the second belt for forming a layer onto which the coated foodstuff is transported for being coated on a bottom side after being transported from the first belt to the upper run of the second belt;

transporting the coated foodstuff to the third belt with particulate material falling through the gap between the second and third belts onto an inside wall of a drum through which the first and second conveyers travel; and rotating the drum for transporting the particulate material to a position above the first conveyor upon which the particulate material falls by gravity characterised in that the particulate material falling through the gap between the second and third belts is distributed by a guiding device to form a substantially even layer over the axial width of the inside wall of the drum.

BRIEF DESCRIPTION OF THE DRAWINGS

The present invention is further illustrated by way of example with reference to the following drawings.

DETAILED DESCRIPTION OF THE DRAWINGS

Figure 1:
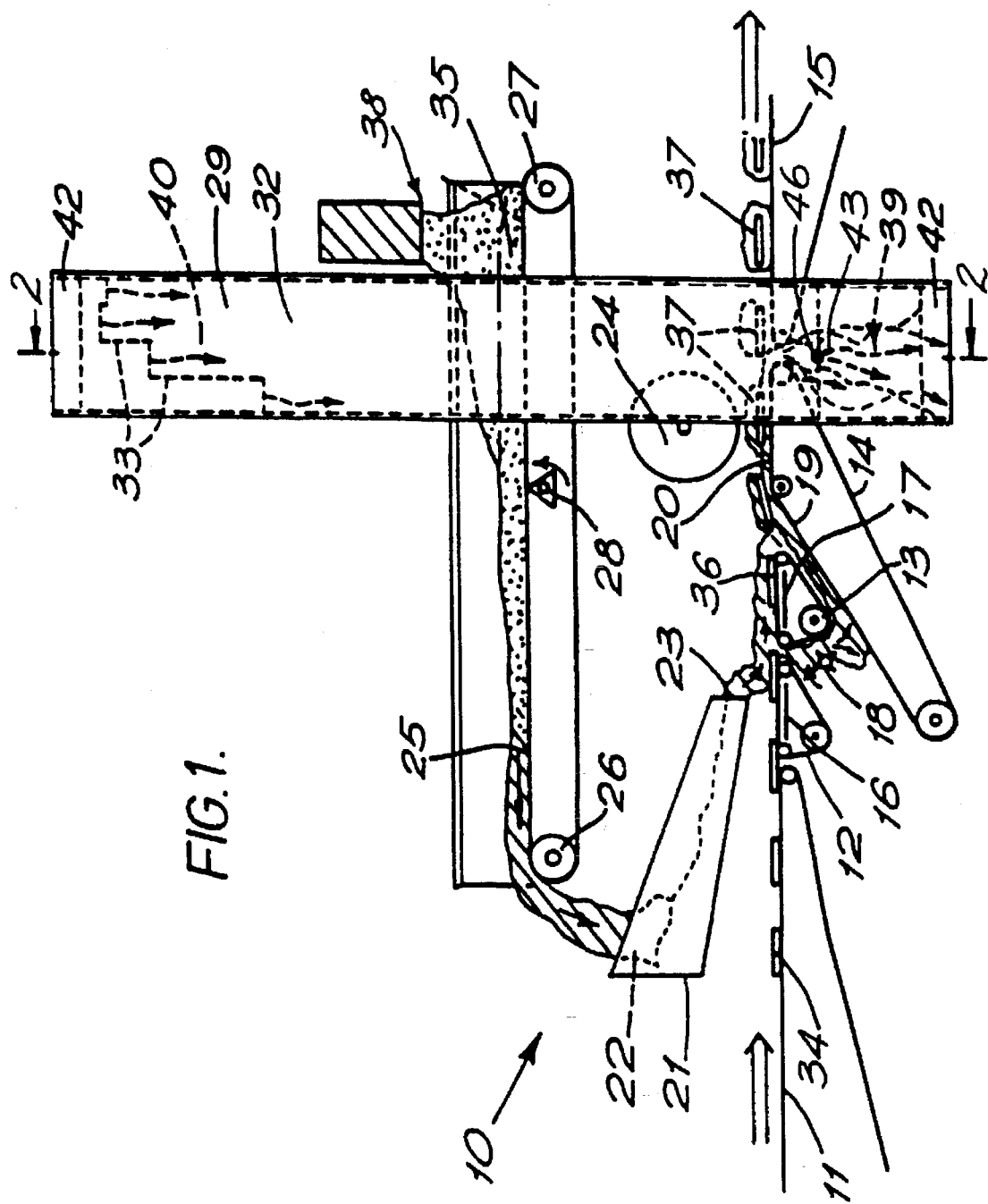
FIG. 1 is a sectional side view of an apparatus which includes a guiding device in accordance with present invention.

Referring to the drawings, the apparatus generally designated 10 comprises a horizontal conveyor for transporting a foodstuff, consisting of a solid belt 11, wire mesh belts 12 and 13 and solid belts 14 and 15, belts 12, 14, and 15 being hereinbefore described as the first, second, and third belts, respectively, and belt 13 being hereinbefore described as the additional belt. Beneath the upper runs of wire belts 12 and 13 are solid plates 16 and 17, respectively. In between wire belts 12 and 13 is a spreading roller 18. The upper run of solid belt 14 has an inclined portion 19 and a horizontal portion 20. Positioned above the horizontal conveyor is a vibrator 21 having an entry opening 22 and an exit opening 23 above wire belt 12, and positioned above the horizontal portion 20 of the upper run of solid belt 14 is a pressure roller 24.

Situated above the vibrator and pressure roller is a horizontal solid endless conveyor belt 25 provided with side walls, trained around rollers 26 and 27 and having a triangular roller 28 underneath the upper run positioned so that the angles contact the upper run as it rotates. The roller 26 is positioned directly over the entry opening 22 of the vibrator 21.

A rotating drum 29, having open ends and having an interior wall which circumscribes a drum hollowed portion, driven by drive rollers 30, 31 is positioned so that the horizontal portion 20 of the upper run of belt 14 as well as part of belts 15 and *25 travel through it. Positioned adjacent the inside wall of the drum 29 at a position of upward rotation of the drum is a stationary baffle plate 32, the upper end of which 33 is designed to allow particulate material to be discharged evenly over the width of the belt 25. Other suitable designs of the upper end of the baffle plate will be readily apparent to a person skilled in the art.

Also illustrated in the drawings are battered frozen fish portions 34, potato cubes 35, battered frozen fish portions coated on top with potato cubes 36, battered frozen fish portions coated completely with potato cubes 37, means 38 whereby potato cubes are continuously added to the upper run of the belt 25, and arrows indicating the fall of potato cubes inside the drum 39 and 40.

The inside wall of the drum is partitioned by means of radially disposed plates 41 and parallel sides 42 defining peripherally adjacent and inwardly opening pockets which carry the potato cubes 35.

Figure 4:
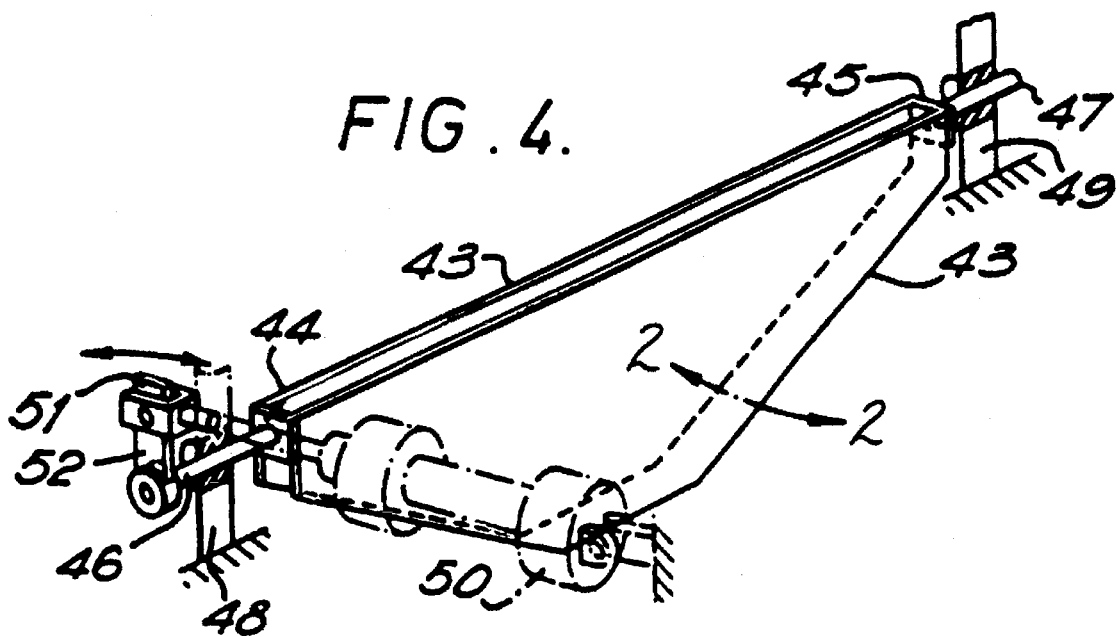
FIG. 4 is a perspective view of a guiding device of the present invention.
Figure 5:
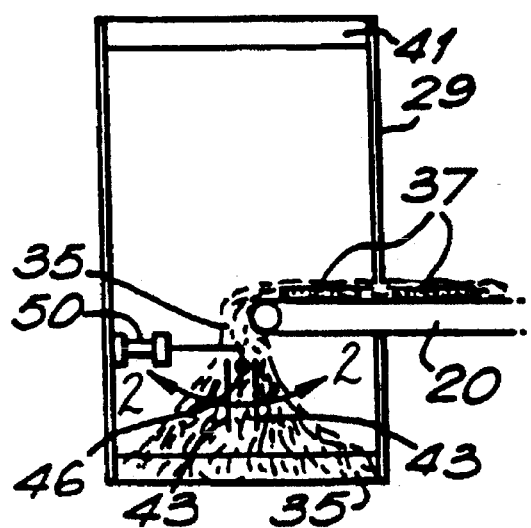
FIG. 5 is a sectional side view of a drum fitted with a guiding device shown in FIG. 4.

FIGS. 4 and 5 illustrate a guiding device comprising a pair of plates 43 positioned within the drum in the hollowed portion so that their upper surfaces lie just below the end of the belt 20 which conveys particulate material and form longitudinal axes which are parallel to, and are of the same width as the upstream edge of the second belt. The plates 43 are fixed at each end to gables 44, 45 in which are fixed pins 46, 47 supported in bearings 48, 49, respectively. A pneumatic or hydraulic cylinder 50 with a reciprocating piston 51 and connecting rod 52 causes the pin 46 to rock to and fro which in turn causes the plates 43 to reciprocate in an axial direction of the drum as indicated by the arrows A—A with a swinging motion.

Figure 6:
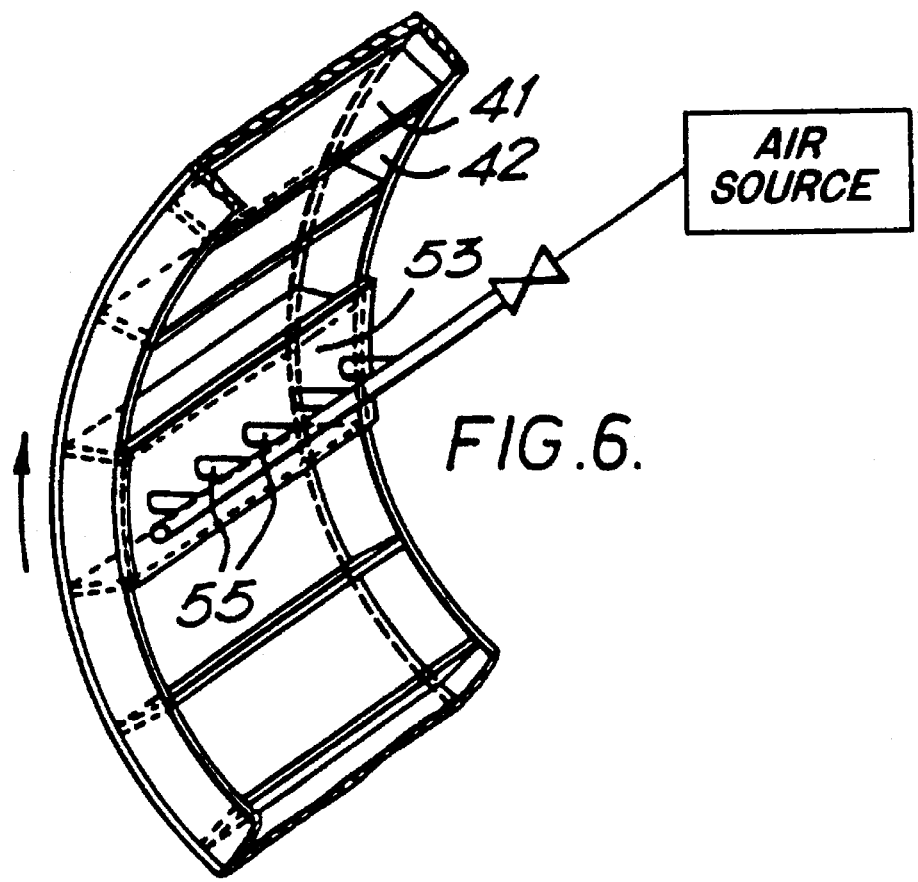
FIG. 6 is a perspective view of part of the wall of the drum showing one type of cleaning device for the wall of the drum.

FIG. 6 illustrates one type of cleaning device for the pockets in the drum comprising a fixed plastics cover 53 which contacts the inner edges of the plates 41 and the parallel sides 42, into which is fitted a pipe 54 attached to a source of compressed air, having outlets 55.

Figure 7:
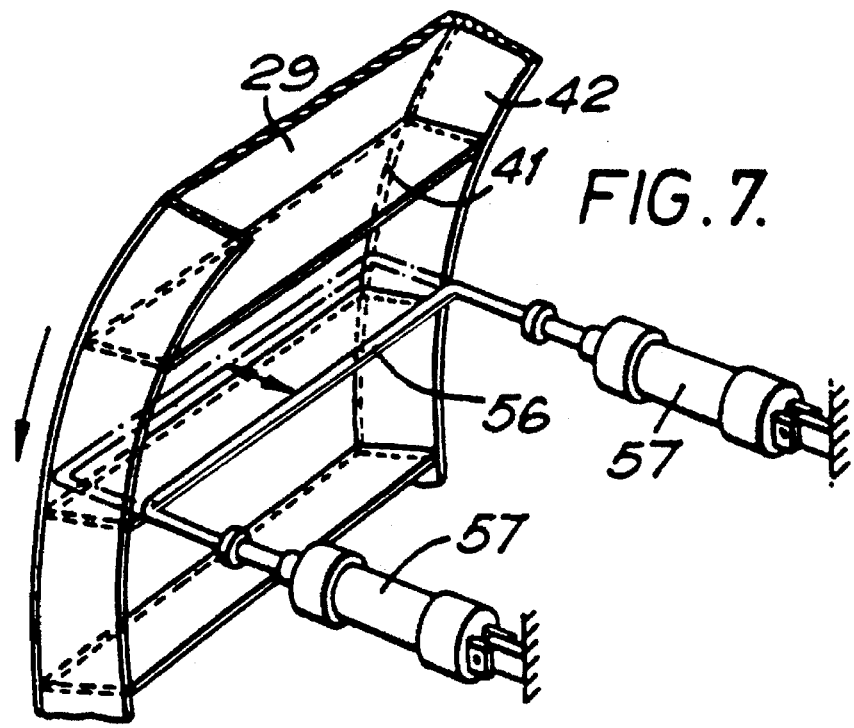
FIG. 7 is a perspective view of part of the wall of the drum showing another type of cleaning de vice for the wall of the drum.

FIG. 7 illustrates another type of cleaning device for the pockets in the drum comprising a wire 56 adapted to reciprocate by means of fixed pneumatic cylinders 57.

In operation, the upper runs of solid belt 11, wire mesh belts 12 and 13, solid belts 14 and 15, the belt 25, the spreading roller 18 and the rotating drum 29 travel in the direction indicated by the arrows.

Battered frozen fish portions 34, each weighing 50 g are fed from a battering machine (not shown) on belt 11. Fresh potato cubes 35 having dimensions of 3 mm×3 mm×7 mm are fed continuously from a means 38 on to the conveyor belt 25 which vibrates by means of the rotation of the triangular roller 28. The potato cubes are transported to the end of the belt which is trained around roller 26 where they fall off and enter the vibrator 21 at the opening 22. The potato cubes leave the vibrator at the exit opening 23 and fall onto the fish portions which are lying on belt 12, to give frozen fish portions coated on top 36. Excess potato cubes fall between belts 12 and 13 onto the inclined portion 19 of the upper run of belt 14 via the spreading roller 18. The excess potato cubes are transported on the inclined portion 19 of the upper run of solid belt 14 in the direction of the arrow to the horizontal portion 20 where the frozen fish portions 36 coated on top travel from belt 13 to lie on the excess potato cubes so that they become completely coated fish portions 37, and pass under the pressure roller 24.

The completely coated fish portions 37 then pass through the rotating drum 29. Inside the drum, excess potato cubes 35 fall between belts 14 and 15, indicated by the arrows 39, and are guided by the swinging plates 43 of the guiding device illustrated in FIGS. 4 and 5, whereby they fall between and on either side of the plates so that they are distributed over substantially the whole width of the lower part of the inside wall of the drum and travel upwards on the inside wall within the pockets defined by the plates 41 and parallel sides 42 and supported by the stationary plate 32, until they reach a position above the belt 25 where, indicated by the arrows 40, they fall onto the belt 25 and spread in an even manner owing to the design of the upper end 33 of the plate 32. There, they are transported, along with potato cubes fed by means 38, to be recirculated by falling off the end of the belt trained around roller 26 into the vibrator 21 and onto the battered fish portions 34.

After emerging from the inside of the rotating drum 29 on the wire belt 15, the completely coated fish portions are transported to a fryer (not shown) and then deep-frozen.

In an alternative embodiment, the wire mesh belts 12 and 13 may be replaced by a single wire mesh belt having perforations large enough to allow the potato cubes to fall through directly on to the inclined portion 19 of the upper run of the belt 14. In this case the solid plates 16 and 17 are absent. This alternative embodiment is also suitable for coating confectionery, chocolate or ice cream with particulate material.

Figure 2:
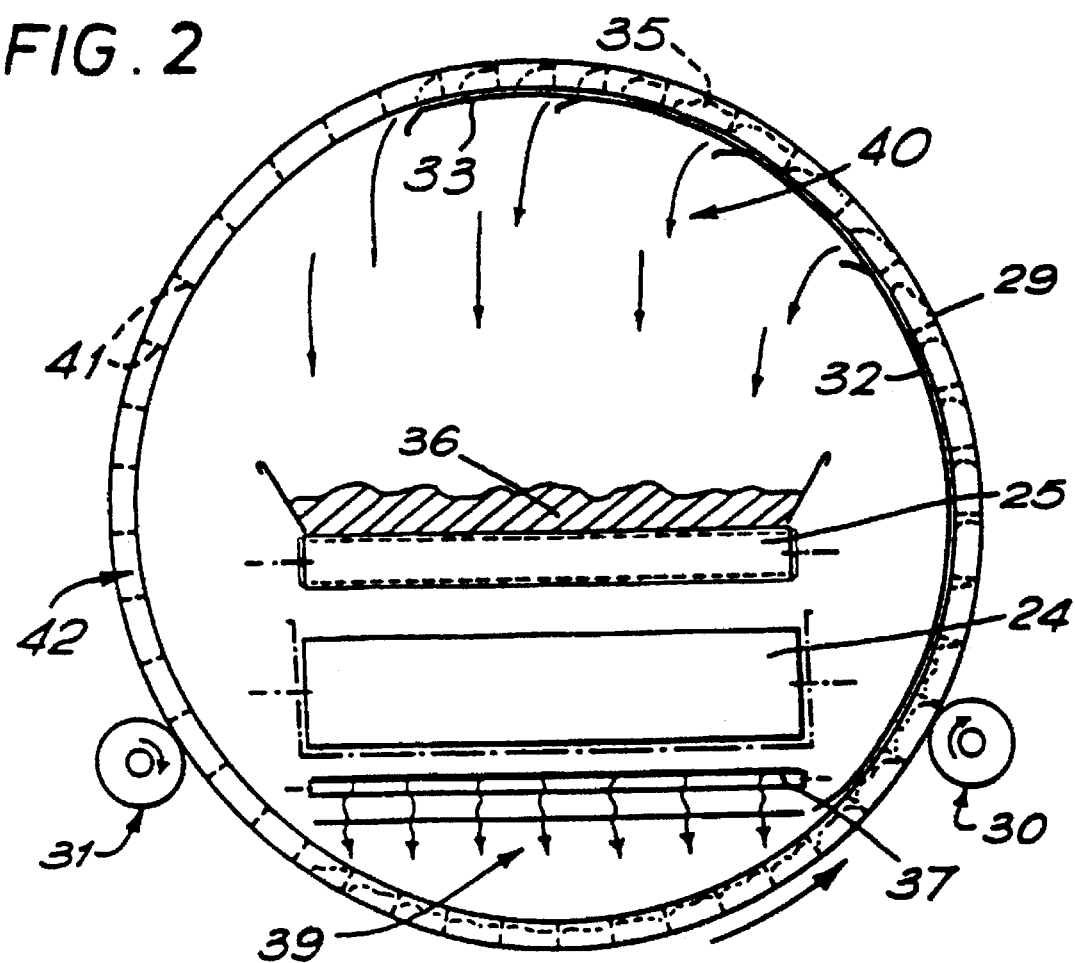
FIG. 2 is a transverse section through the drum illustrated in FIG. 1 along the line A—A in FIG. 1.
Figure 3:
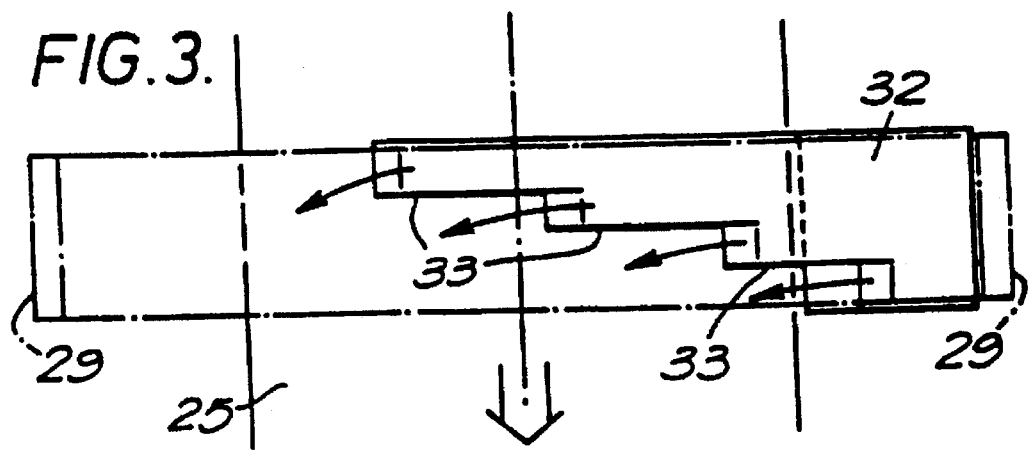
FIG. 3 is a top plan view of the upper end of a stationary plate positioned adjacent the inside wall of the drum.

After the potato cubes 35 have fallen from the inside wall of the drum onto the belt 25, the pockets of the drum defined by the radially disposed plates 41 and parallel sides 42 are cleaned by a cleaning device, as illustrated in either FIG. 6 or FIG. 7, positioned on the left hand side of the drum, i.e., at a position of downward rotation of the drum, illustrated in FIG. 2.

In the embodiment illustrated in FIG. 6, as the drum rotates, a pocket passes the fixed plastics cover 53 which contacts the inner edges of the plates 41 and the parallel sides 42 so that the pocket is completely covered before a blast of compressed air emerging through outlets 55 dislodges any particulate material which has stuck to the inside wall. Because the pocket is completely covered, no cubes are blown out of the machine.

In the embodiment illustrated in FIG. 7, as the leading end 41 of each pocket passes the wire 56, the pneumatic cylinder 57 is timed by a sensor to advance the wire into the pocket where it scrapes the inner wall 29 as the drum rotates until the rear end 41 of the pocket reaches the wire, whereupon the wire is withdrawn by means of the fixed pneumatic cylinder 57.

I claim:

1. An apparatus for distributing particulate material comprising a rotatable drum having an interior circumferential wall which is positioned to have a horizontal axis and which defines a hollowed drum interior, a first endless belt for conveying particulate material, a second endless belt positioned to extend end-to-end with the first belt so that adjacent ends of the first and second belts terminate within the drum interior and are separated by a gap so that particulate material conveyed on the first belt falls off the end of the first belt into the gap, and a guiding device which comprises an oscillable plate which is positioned so that an edge of the plate extends in a direction parallel to the end of the first belt for guiding and distributing particulate material which falls into the gap substantially evenly over an axial width of a portion of the interior wall.

2. An apparatus according to claim 1 wherein the plate is oscillable to reciprocate with a pendulous motion about an axis.

3. An apparatus according to claim 2 wherein the plate is connected to a hydraulic cylinder to reciprocate the plate.

4. An apparatus according to claim 2 wherein the plate is connected to a pneumatic cylinder to reciprocate the plate.

5. An apparatus according to claim 1 wherein the plate is a first plate and wherein the guiding device further comprises a second oscillable plate which is arranged at a position displaced from the first plate and so that an edge of the second plate extends in a direction parallel to the end of the first belt for, together with the first plate, guiding and distributing the particulate material which falls into the gap substantially evenly over an axial width of a portion of the interior wall.

6. An apparatus according to claim 1 or 5 further comprising partitions positioned on the interior wall which define drum wall pockets for transporting the particulate material distributed to the interior wall by the guiding device.

7. An apparatus according to claim 1 or 5 further comprising a conveyor positioned within the drum at a position above the first and second belts, partitions positioned on the interior wall which define drum wall pockets for transporting the particulate material distributed to by guiding device to a position above the conveyor for depositing, by gravity, the particulate material onto a surface of the conveyor, and an arcuate stationary baffle plate positioned within a portion of the drum adjacent the pockets at a position of upward rotation of the drum for retaining the particulate material transported by the pockets.

8. An apparatus according to claim 7 further comprising a device positioned for cleaning the pockets of the drum at a position of the downward rotation of the drum.

9. An apparatus according to claim 8 wherein the cleaning device is comprised of a source of compressed air connected to piping having outlets positioned for directing compressed air adjacent inner edges of the partitions and pockets.

10. An apparatus according to claim 8 wherein the cleaning device comprises a wire which is reciprocable and which is positioned to clean inner edges of the partitions and pockets.

* * * * *